United States Patent [19]

Schmitt

[11] Patent Number: 4,555,488

[45] Date of Patent: Nov. 26, 1985

[54] METHOD FOR DETERMINING FLOW PATTERNS IN SUBTERRANEAN PETROLEUM AND MINERAL CONTAINING FORMATIONS USING ORGANONITROGEN TRACERS

[75] Inventor: Kirk D. Schmitt, Pennington, N.J.

[73] Assignee: Mobil Oil Corporation, New York, N.Y.

[21] Appl. No.: 559,657

[22] Filed: Dec. 9, 1983

Related U.S. Application Data

[60] Division of Ser. No. 353,544, Mar. 1, 1982, Pat. No. 4,420,565, which is a continuation-in-part of Ser. No. 221,692, Dec. 31, 1980, abandoned.

[51] Int. Cl.[4] .................... G01N 33/24; G01N 31/08
[52] U.S. Cl. ........................................ 436/27; 436/56
[58] Field of Search ................ 436/27, 56; 166/250, 166/252; 250/259, 302, 303; 422/54; 364/422; 324/307; 367/25, 33

[56] References Cited

U.S. PATENT DOCUMENTS

| | | | |
|---|---|---|---|
| 2,578,500 | 12/1951 | Berhard et al. | 166/252 X |
| 2,868,625 | 1/1959 | Frank | 436/27 |
| 3,435,672 | 4/1969 | Brink et al. | 436/27 |
| 3,607,096 | 9/1971 | Hartmann | 422/54 |
| 3,615,237 | 10/1971 | Speakman | 422/54 |
| 3,847,548 | 11/1974 | Keller et al. | 436/27 |
| 3,851,171 | 11/1974 | Saniford et al. | 250/259 |
| 4,055,399 | 10/1977 | Parrish | 166/252 X |
| 4,264,329 | 4/1981 | Beckett | 436/27 |

*Primary Examiner*—Kenneth M. Schor
*Attorney, Agent, or Firm*—Alexander J. McKillop; Michael G. Gilman; Edward J. Trojnar

[57] ABSTRACT

The method for determining flow patterns within a subterranean formation penetrated by a spaced apart injection system and production system that comprises injecting into the formation at a predetermined depth from the injection system a solution containing a small amount of one or more water-soluble tracer compounds, recovering said tracer in the production system, determining the depth of recovery, and identifying said tracer compounds by gas chromatography and flame ionization detector; said tracer compounds being water-soluble organic compounds having phosphorus, nitrogen, or sulfur in the molecule.

9 Claims, No Drawings

METHOD FOR DETERMINING FLOW PATTERNS IN SUBTERRANEAN PETROLEUM AND MINERAL CONTAINING FORMATIONS USING ORGANONITROGEN TRACERS

CROSS REFERENCE TO RELATED APPLICATIONS

This is a division of copending application Ser. No. 353,544, filed Mar. 1, 1982, U.S. Pat. No. 4,420,565; which is a continuation-in-part of U.S. application Ser. No. 221,692, filed Dec. 31, 1980 (abandoned) which is incorporated by reference in entirety.

BACKGROUND OF THE INVENTION

1. Field of the Invention

This invention is directed to novel tracers for the determination of flow patterns in subterranean formations.

2. Description of the Prior Art

In recovery of petroleum or minerals from subterranean formations, especially by chemical flooding, it is desirable to know the flow patterns of the formation prior to injection of chemicals. Tracers are used in such reservoir engineering. In the actual recovery process, during chemical injections, it is advantageous to follow the flow of each slug by using a tracer in the slug. Ideally, a tracer should be water soluble and inert to the solids and liquids in the formation. By inert is meant that it does not get absorbed onto the rocks; it does not partition into any oil phase which may be present; and it does not interact with the organics and minerals present in the formations. When injected with another chemical agent, it should also be inert to the chemical it is injected with. A tracer should also be easily and accurately detected by simple methods without interference by any substances present in the connate fluids.

The tracers now employed are radioactive isotopes and compounds like potassium iodide, ammonium thiocyanate and dichromate. Radioactive isotopes are expensive and require special handling by licensed personnel. Potassium iodide and alike are detected by wet analyses and, therefore, bear the limitations of such analyses.

SUMMARY OF THE INVENTION

The method for determining flow patterns within a subterranean formation penetrated by a spaced apart injection system and production system that comprises injecting into the formation at a predetermined depth from the injection system a solution containing a small amount of one or more tracer compounds, recovering said tracer in the production system, determining the depth of recovery, and identifying said tracer compounds or the metal by gas chromatography and flame ionization detector; said tracer compounds being volatile, water-soluble organic compounds having phosphorus, nitrogen, or sulfur in the molecule.

DESCRIPTION OF SPECIFIC EMBODIMENTS

The method of this invention is applicable to determine flow patterns in any subterranean formation from which petroleum, including tar sands, or minerals are to be recovered, as by chemical flooding.

The present invention is carried out in a subterranean formation that is penetrated by spaced apart injection and production systems extending from the surface of the earth into the formation. The injection system consists of one or more wells into which are introduced fluids. The production system comprises one or more wells from which product is recovered. The wells in the injection and production systems are spaced apart and can be arranged in any desired pattern, such as patterns well known in waterflood operations. For example, the pattern can comprise a central injection well and a plurality of recovery wells spaced radially about the injection well.

In carrying out the invention, a solution containing a small amount of one or more water-soluble tracer compounds, defined hereinafter, is injected into the formation at a predetermined depth in the injection system. Injection is via a perforation through the casing of the injection well. As the tracer solution travels through the formation and reaches the production system, it is recovered in a production well and the depth at which recovery is made is determined. The solution is identified by identifying the tracer compounds by gas chromatography and flame ionization detector. Advantageously the tracer solution is an aqueous solution preferably an aqueous saline solution. An ideal source of the saline solution or brine is connate water previously obtained in production from the formation.

The tracers used in the method of this invention are volatile organic compounds, preferably non-gaseous under ambient conditions. They are substantially inert in the formation in which they are used meaning that they are not absorbed on the rocks; do not partition into any oil phase; and do not interact with the organics and minerals present in the formation. Particularly suitable are compounds having phosphorus, nitrogen, or sulfur in the molecule. Examples of useful tracers are N,N-dimethylbenzamide; N,N-dimethylanthranilic acid; N,N-dimethylaminobenzoic acid; N,N-dimethylammonium dimethyldithiocarbonate; N,N-dimethylaniline sulfonic acid; dimethylpyrazine; dimethyl quinolinate; dimethyl sulfone; dimethyl sulfoxide; dimethylthiourea; dimethylurea; dimethylnitrosamine; dimethylamine; N,N-dimethylacetamide; N,N-dimethylformamide; trimethylamine hydrochloride; trimethylmethoxypropenyl ammonium bromide; trimethylphenyl ammonium iodide; trimethyl phosphate; trimethyl phosphite; trimethylurea; methyl-n-propylamine; methyl propyl ketone oxime; methylpyrroline; methylsulfonic acid; methyl hydrogen sulfate; methyluracil; methylurea; N-methylphenylene diamine; methylpiperidine; methylmercaptan; methyl nitramine; methylglyoxalidine; methylhydrazine; methylhydrazine sulfate; methylhydroxylamine; methylhydroxylamine hydrochloride; methyldiethylamine; methylethydiamine hydrochloride; N-methylbenzamide methylallylamine; methylaminoethanol; alpha-N-methylamino propionic acid; ethanolamine; ethoxyethyl carbamate; N-ethylacetamide; ethylamine; N-ethyl formamide; ethyl glycinate; ethylhydrazine; ethylhydroxylamine; S-ethyl thioglycolic acid; ethylurea; ethylene cyanohydrin; ethylenediamine; propylamine; butyldiethanolamine; butylamine; and aminopyridine.

The amount of tracer compound used is small. In general, concentrations can range between about 10 ppm and about 20,000 ppm. At a few tens of ppm, detection by gas chromatography and flame ionization detector is possible. Preferred concentrations are between about 100 ppm and 1,000 ppm. The use of mixtures of tracer compounds is contemplated.

The feasibility of the method of this invention is demonstrated in the following examples. The core samples used were obtained from the West Burkburnett field in Texas, a typical sandstone type of formation.

EXAMPLE 1

A gas chromatograph was made of a mixture of 1,000 ppm trimethyl phosphate, 400 ppm triethyl phosphate, and 250 ppm tripropyl phosphate in West Burkburnett produced brine (connate water). The solution of tracers in connate water was shaken with an equal volume of crude oil and another gas chromatograph was taken. This chromatograph compared with the initial chromatograph showed that 95% of the tripropyl phosphate had partitioned into the oil phase, as did 69% of the triethyl phosphate. The trimethyl phosphate was not detectably partitioned into the oil phase. Thus, tripropyl phosphate and triethyl phosphate would be suitable tracers only in formations not containing crude oil. Trimethyl phosphate satisfies all the conditions for use in reservoirs containing crude oil. West Burkburnett connate water does not contain any substance which interferes with the tracer determination, as shown by its gas chromatograph.

EXAMPLE 2

A three inch long by one inch diameter sandstone core from the West Burkburnett field was held in a Hassler cell and flushed with connate water until no oil could be seen in the eluate. The approximately 10 ml of pores of the core contained about 35% crude oil and 65% brine (16% total dissolved solids). Flow of connate water was stopped and flow of tracers begun. After 5-7 ml. tracer had been injected, connate water flow was begun again and two ml. samples were collected and analyzed by gas chromatography by injecting 6 μl fractions onto a 2 ft.×¼" 10% SE-30 column temperature programmed from 125° C. to 200° C. at 15° C. min. and detecting with an ordinary flame ionization detector. Because of dead space limitations in the Hassler cell, the volume of tracer is considered accurate to 1.5 ml. In the first example, a tracer containing 1,000 ppm trimethyl phosphate and 400 ppm triethyl phosphate was injected. Table I shows the data obtained. Clearly, the partitioning of the triethyl phosphate into the oil makes it an unsuitable tracer even though the material balance is complete to within experimental error.

EXAMPLE 3

The same experiment as in Example 2 was carried out but the tracer contained 1,000 ppm each Me$_2$NCHO, Me$_2$NCOCH$_3$, MeSOMe (DMF, DMA, DMSO, resp.).

The analysis was carried out by injecting a 6 μl solution onto a 6 ft.×¼" 10% Apiezon L column programmed from 165° C. to 195° C. at 2° C./min. detecting with an ordinary flame ionization detector. Table II shows all three of these compounds to be eluted completely. They do not partition into the oil (as did triethyl phosphate in Example 2).

TABLE I

| Volume Eluate Collected | Cumulative Volume Eluate | ppm (MeO)$_3$PO | ppm (EtO)$_3$PO |
|---|---|---|---|
| 1.27 | 1.27 | 0 | 0 |
| 1.83 | 3.10 | 0 | 0 |
| 1.83 | 4.93 | 0 | 0 |
| 1.38 | 6.31 | 0 | 0 |
| 1.68 | 7.99 | 0 | 0 |
| 1.81 | 9.80 | 430 | 3 |
| 1.83 | 11.63 | 650 | 5 |
| 1.80 | 13.43 | 1,000 | 17 |
| 1.78 | 15.21 | 540 | 58 |
| 1.83 | 17.04 | 370 | 100 |
| 1.80 | 13.43 | 1,000 | 17 |
| 1.78 | 15.21 | 540 | 58 |
| 1.83 | 17.04 | 370 | 100 |
| 1.47 | 18.51 | 200 | 130 |
| 1.75 | 20.26 | 150 | 200 |
| 1.82 | 22.08 | 29 | 135 |
| 1.82 | 23.90 | 12 | 83 |
| 1.83 | 25.73 | 0 | 45 |
| 1.87 | 27.60 | 0 | 52 |
| 1.86 | 29.46 | 0 | 40 |
| 1.89 | 31.35 | 0 | 39 |
| 1.87 | 33.22 | 0 | 17 |
| 1.90 | 35.12 | 0 | 9 |
| 1.87 | 36.99 | 0 | 9 |
| 1.88 | 38.87 | 0 | 0 |

| Mass balance | (MeO)$_3$PO | | (EtO)$_3$PO | |
|---|---|---|---|---|
| Conc. in × Volume in | 4930 | 1500 | 1970 | 600 |
| Conc. out × Volume out | 6030 | | 1660 | |

TABLE II

| Volume Eluate Collected | Commutative Volume Eluate | DMF (ppm) | DMA (ppm) | DMSO (ppm) |
|---|---|---|---|---|
| 1.39 | 1.39 | 0 | 0 | 0 |
| 1.70 | 3.09 | 0 | 0 | 0 |
| 1.87 | 4.96 | 88 | 79 | 0 |
| 1.88 | 6.85 | 120 | 110 | 120 |
| 1.72 | 8.57 | 420 | 420 | 250 |
| 1.94 | 10.50 | 620 | 640 | 680 |
| 1.86 | 12.36 | 820 | 790 | 830 |
| 1.84 | 14.20 | 820 | 810 | 880 |
| 1.86 | 16.05 | 590 | 540 | 720 |
| 1.78 | 17.83 | 370 | 510 | 490 |
| 1.77 | 19.61 | 340 | 290 | 420 |
| 1.82 | 21.43 | 150 | 190 | 280 |
| 1.83 | 23.26 | 90 | 90 | 200 |
| 1.81 | 25.07 | 90 | 90 | 200 |
| 1.80 | 26.87 | 90 | 90 | 90 |
| 1.86 | 28.74 | 90 | 90 | 90 |
| 1.85 | 30.58 | 7 | 70 | 0 |
| 1.82 | 32.40 | 70 | 70 | 0 |
| 1.76 | 34.16 | 0 | 0 | 0 |

| Mass balance | DMF | | DMA | | DMSO | |
|---|---|---|---|---|---|---|
| Conc. in × Volume in | 6850 | 1500 | 6850 | 1500 | 6850 | 1500 |
| Conc. out × Volume out | 9180 | | 8900 | | 8970 | |

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. The method for determining flow patterns within a subterranean formation penetrated by a spaced apart injection system and a production system, said method comprising injecting into the formation at a predetermined depth in the injection system a solution containing a tracer compound present in sufficient quantity for identification, recovering said solution containing tracer compound in the production system, determining the depth of recovery, and identifying said tracer compounds by gas chromatography and flame ionization detector; said tracer being a volatile water-soluble organic compound containing a hydrocarbon moiety and nitrogen, selected from the group consisting of formamides, acetamides, ureas and thioureas.

2. The method of claim 1 in which said tracer is injected into an oil containing formation and tracer does not partition into the oil.

3. The method of claim 1 in which said tracer is injected in an aqueous saline solution.

4. The method of claim 1 in which said tracer is non-gaseous under ambient conditions.

5. The method of claim 1 in which said tracer is an amide.

6. The method of claim 1 in which said tracer is a urea.

7. The method of claim 1 in which said tracer is a thiourea.

8. The method of claim 1, in which said tracer is dimethyl formamide.

9. The method of claim 1, in which said tracer is dimethyl acetamide.

* * * * *